(No Model.)

J. O. SMITH.
ERASER.

No. 561,181.

Patented June 2, 1896.

WITNESSES:
John Buckler
C. Gerst

INVENTOR
John O. Smith
BY
Edgar Tate & Co
ATTORNEYS.

ANDREW B GRAHAM. PHOTO-LITHO WASHINGTON. D.C.

UNITED STATES PATENT OFFICE.

JOHN O. SMITH, OF DENVER, COLORADO.

ERASER.

SPECIFICATION forming part of Letters Patent No. 561,181, dated June 2, 1896.

Application filed February 5, 1896. Serial No. 578,101. (No model.)

*To all whom it may concern:*

Be it known that I, JOHN O. SMITH, a citizen of the United States, and a resident of Denver, in the county of Arapahoe and State of Colorado, have invented certain new and useful Improvements in Erasers, of which the following is a specification, reference being had to the accompanying drawings, forming a part thereof, in which similar letters of reference indicate corresponding parts.

This invention relates to erasers; and the object thereof is to provide an improvement in this class of devices, which consists in a handle by means of which two erasers, one for erasing ink-marks and the other for erasing pencil-marks, may be connected and held for use, a further object being to provide a device of this class to which new erasers may be applied whenever desired; and with this and other objects in view the invention consists in the construction, combination, and arrangement of parts hereinafter described and claimed.

The invention is fully disclosed in the following specification, of which the accompanying drawings form a part, in which—

Figure 1:
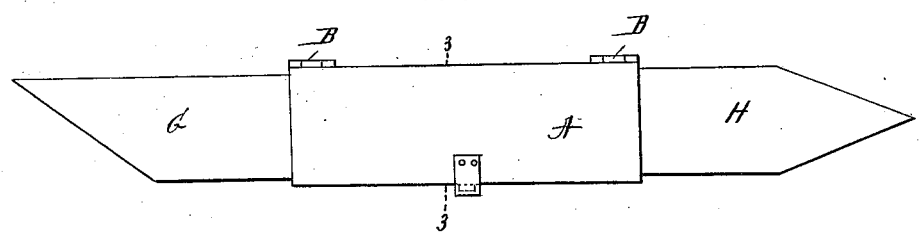
Figure 2:
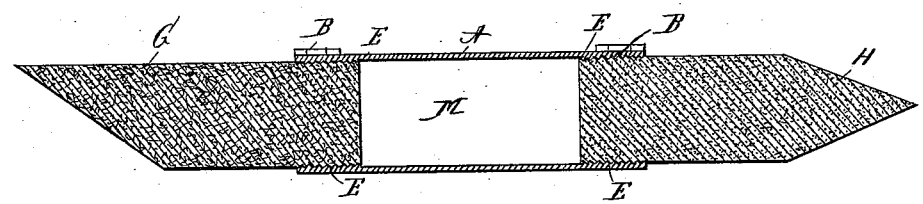

Figure 1 is a side view of my improved eraser-holder, showing the erasers connected therewith; Fig. 2, a longitudinal section thereof, and Fig. 3 a transverse section on the line 3 3 of Fig. 1.

Figure 3:
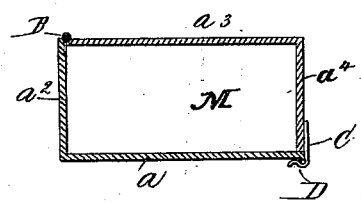

In the practice of my invention I provide an eraser-holder A, which is preferably oblong in form and rectangular in cross-section, as clearly shown in Figs. 1 and 3, and this holder consists of two separate parts, one of which comprises a bottom portion $a$ and an end portion $a^2$, and the other a top portion $a^3$ and an end portion $a^4$. The top portion $a^3$ of the second part is hinged to the end portion $a^2$ of the first part, as shown at B, and one of said parts is provided with a hinged cross-plate or catch C, which is adapted to operate in connection with a shoulder or projection on the other part at D, by means of which the separate parts of the holder are clasped and securely held together.

The inner surface of the sides and the top and bottom of my improved eraser-holder are provided with serrations or teeth E, as shown in Fig. 2, and by means of these serrations or teeth the same is adapted to grasp and securely hold the erasers G and H. One of these erasers is adapted for use as an ink-eraser and the other as a pencil-eraser, and said erasers may be of any desired construction or composed of any desired material, and it will be apparent that my invention is not limited to the form of the holder or handle A in cross-section, and the same may be tubular in form, if desired, and I reserve the right to make all such changes in and modifications of the construction herein described as fairly come within the scope of the invention.

Although I have described my improvement as an eraser-holder, it is evident that the same may also serve as a receptacle for stamps, pens, and other articles, the chamber M being well adapted for this purpose, and my improvement may thus be made to serve as a receptacle for stamps and similar articles.

Having fully described my invention, I claim as new and desire to secure by Letters Patent—

As a new article of manufacture, an eraser-holder divided longitudinally into two parts which are hinged together on one side and provided with locking devices, on the opposite side, the inner surface of the holder ends being serrated to better hold the erasers, and a smooth-walled central chamber being formed between the end serrations for holding pens, stamps or other articles, all constructed and arranged substantially as herein shown and described.

In testimony that I claim the foregoing as my invention I have signed my name, in presence of the subscribing witnesses, this 31st day of January, 1896.

JOHN O. SMITH.

Witnesses:
FRANK D. WALLAKER,
WALTER GRAEBER.